Sept. 25, 1928.
A. O. AUSTIN
1,685,662
TERMINAL FOR BUSHING INSULATORS
Filed Aug. 3, 1922
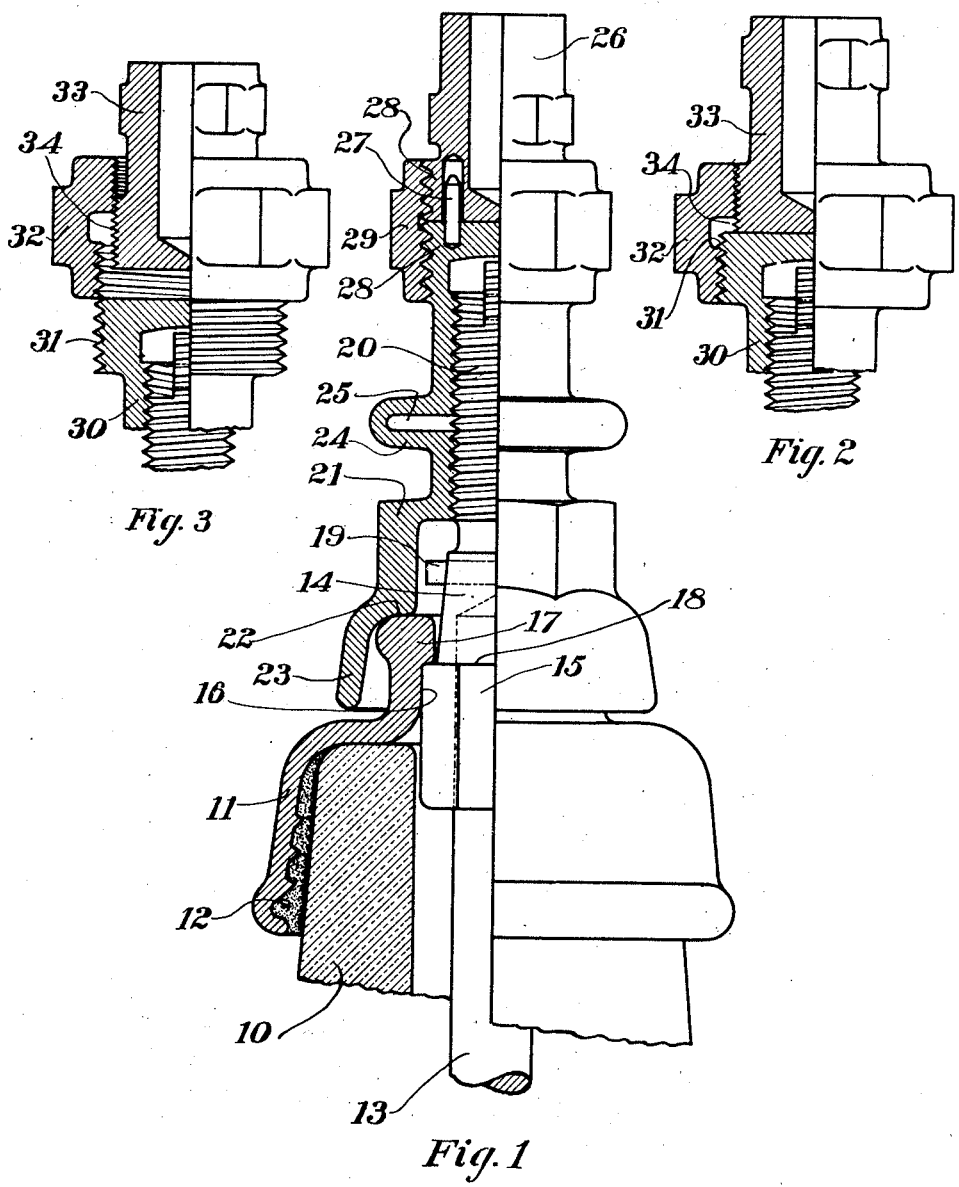
INVENTOR
Arthur O. Austin
BY
Nissen & Crane
ATTORNEY Patented Sept. 25, 1928.

1,685,662

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

TERMINAL FOR BUSHING INSULATORS.

Application filed August 3, 1922. Serial No. 579,349.

This invention relates to terminals by which conductors from insulator bushings are connected with conductors leading away from the bushing and by which the end of the bushing is closed. The invention has for its object the provision of a bushing terminal which shall provide low resistance connection for the conductors, which shall be convenient to install and replace and which shall be of improved construction and operation.

The invention is exemplified in the combination and arrangement of parts shown in the accompanying drawing and described in the following specification and it is more particularly pointed out in the appended claims.

In the drawing:

Fig. 1 is a part elevation and part section showing one embodiment of the present invention.

Fig. 2 is a modified form of clamp for securing the lead terminal to the bushing fitting.

Fig. 3 is a view similar to Fig. 2 showing the parts in position for tightening.

In Fig. 1 the numeral (10) shows a dielectric bushing having cap fitting (11) secured thereon by cement (12) or other suitable fastenings. Conductor (13) is provided with a terminal lug (14), connected thereto, the lug (14) having an angular shaped portion (15) fitting into a correspondingly shaped socket (16) in the cap (11). A shoulder (17) on the cap engages a shoulder (18) on the lug for limiting upward movement of the conductor. A pin (19) may be inserted in an opening in the conductor lug above the cap (11) to prevent the conductor from accidently falling into the bushing when released. The upper end of the lug (15) is threaded as shown at (20) and a cover cap (21) is screwed onto the threaded end (20) and engages the fitting (11), closing the opening in the bushing. If found desirable for the purpose of making a tight joint, a gasket may be inserted at (22), between the parts (11) and (21), or at 18 between the parts 15 and 17. A flange (23) forms a drip lip which prevents water entering the joint between the parts (11) and (21). The threaded portion of the cap (21) is divided into upper and lower sections by a spring portion (24) in the wall of the cap. This portion is U shaped in cross section to provide a recess (25) to permit slight movement of the upper and lower sections, relative to one another, such movement being resisted by the stiffness of the part (24). The two parts may be compressed toward one another at the time the threads are cut, after which they are released, prior to being placed upon the threaded member (20). It will be apparent that when the cap is screwed upon the member (20), it will be again drawn into the compressed condition it occupied at the time the threads were cut and the resiliency of the member (24) will exert a force upon the threaded contact holding the surfaces in close connection with one another. In this way, low resistance electrical connection is provided between the cap (21) and the threaded end (20) of the lug (14), and yet a fairly loose fitting thread may be used.

A similar result may be secured by cutting the threads in the cap at a slightly greater or less pitch than that of the threads (20). This will cause the threads to jam when brought together and will draw the upper portion of the cap down toward or force it away from the lower portion, thus providing tight contact between the threaded surfaces.

A lug (26) for a lead conductor has butt end connection with the upper end of the cap (21). Dowel pins (27) may be provided for preventing relative rotation of the two connecting parts. The lug (26) and the upper end of the cap (21), are provided with right and left hand threads (28) respectively which mesh with corresponding threads in a clamping nut (29), whence the clamping nut not only forces the contacting faces of the two members against one another but causes the engaging surfaces of the threads to bind against one another, providing additional electrical connection. The teeth of the threads provide corrugated engaging surfaces, affording greatly increased contact area on both of the connected members.

In the modification shown in the Figs. 2 and 3, a cap (30) is threaded at (31) to receive a clamping nut (32) and a conductor lug (33) is provided with threads (34) of less pitch than the threads (31) for engaging the opposite portion of the clamping nut (32). The threaded parts are preferably made of different diameters to provide a clear distinction, but this feature is not essential. In connecting the parts together, the nut (32) is first backed upon the threads (34) as shown in Fig. 3 and the threads (31) are then brought into engagement with the lower threaded portion of the locking nut. The two parts (30) and (33) are then held from rotative movement and the nut (32) is screwed onto the threads (31). At the same time it will move downwardly on the threads (34) but, because of the difference in pitch there will be a differential action drawing the parts (30) and (33) together so as to clamp them in contact with one another as shown in Fig. 2.

By using a thread of a different pitch between the weather cap (21) and the lug (20), it is possible to obtain considerable latitude in the machining and still obtain a low contact resistance. Where difference in pitch is used the tightening will occur gradually and the strain distributed between several threads due to elastic stretch of the material. If several pockets (25) are used a low contact resistance may be obtained and large areas used without the necessity of close limits as to diameter. Where the diameter must be closely watched for fit, considerable difficulty is found in working interchangeable parts.

The improved terminal is particularly valuable where conductors of large cross-section are used as large contact surfaces may be provided which may be readily made and remade without destroying their efficiency. The desired contact surface together with low contact resistance are obtained with an imperforate weather cap.

I claim:

1. A dielectric bushing, a fitting on said bushing, a conductor extending through said fitting and having means thereon for limiting outward movement thereof, a closure cap threaded on said conductor to tighten said conductor against said limiting means, the threaded connection on said cap having portions thereof differing from one another in respect to registration with the threads in said conductor, said cap having resilient means for permitting relative movement of said differently threaded portions.

2. A dielectric bushing having a fitting thereon, a conductor extending through said fitting, means for limiting outward movement of said conductor, a closure cap threaded on said conductor against said fitting to form a tight joint, the threaded portion of said cap having resiliently connected sections, the threads of which are offset relative to one another.

3. A dielectric bushing having a metallic fitting thereon, a conductor extending through said bushing, contacting shoulders on said conductor and fitting to limit outward movement of said conductor, a closure cap threaded on said conductor for drawing said contacting shoulders against one another to hold said conductor in position in said fitting, said cap engaging said fitting to close the opening therein, resilient means in said cap for exerting pressure on the threaded surfaces of said cap and conductor, a lead conductor engaging said cap and a clamping member having connections with said cap and lead conductor and acting to draw said cap and lead conductor into contact with one another when said clamping member is rotated in one direction without rotation of either said cap or lead conductor.

4. A dielectric bushing having a conductor extending therethru, a terminal member threaded on said conductor, resilient means for causing pressure between the threaded surfaces of said terminal member and conductor, a conductor lead engaging said terminal member and a clamping device having threaded engagement with said terminal member and said lead and acting to draw said terminal member and said lead into close engagement with one another when rotated while said conductor and conductor lead are stationary as to rotative movement.

5. The combination with an insulator bushing, of a cover cap for closing the end of said bushing, and means for securing a conductor lead to said cover cap to permit connection between said lead and cover cap without requiring rotation of said cover cap on said bushing, said securing means comprising interfitting depressions and projections on said conductor lead and cover cap to hold said lead and cover cap against relative rotation but permitting relative movement thereof toward each other and a threaded device engaging said lead and cover cap and arranged to draw said lead and cover cap together when rotated while said lead and cover cap remain stationary with respect to rotation about the axis of rotation of said threaded device.

6. The combination with an insulator bushing, of a conductor having a threaded portion projecting from said bushing, a cover cap threaded on said conductor and held in position to close the opening in said bushing by the threaded connection between said cover cap and conductor, a conductor lead having butt end connection with said cover cap, interfitting depressions and projections on said lead and cover cap to hold said lead and cover cap against relative rotation while permitting relative movement thereof toward each other, and a coupling member having threaded connection with said lead and cover cap, said threaded connection being arranged to draw said lead and cover cap together when said coupling member is rotated relative to said lead and cover cap.

7. An insulator bushing comprising a dielectric member, a fitting secured to said dielectric member, a conductor lead projecting from said fitting and having a shoulder thereon engaging said fitting to limit outward movement of said conductor from said fitting, a cover cap threaded on said conductor and held in position to close said fitting by the threaded connection between said cover cap and conductor, a conductor lead having butt end connection with the end of said cover cap, said lead and cover cap having an interfitting pin and socket respectively for holding said lead and cover cap against relative rotation, and a coupler having unlike threaded connections with said lead and cover cap respectively for drawing said lead and cover cap together when said coupler is rotated relative to said lead and cover cap.

8. In a dielectric bushing, a fitting to be secured to the dielectric bushing, an internally threaded cover cap mounted upon the fitting, a conductor having a threaded engagement with the threads of the cover cap, means to exert a force upon the threaded connection to hold the surfaces in close connection with one another to produce a low resistance electrical union, a conductor lead engaging the cap externally thereof, and a clamping device having unlike threaded connection with said cap and said lead respectively for drawing said lead and cap together when the clamping device is rotated.

9. In a dielectric bushing, a fitting to be secured to the dielectric member, an internally threaded cover cap mounted upon the fitting, a conductor having a threaded engagement with the threads of the cover cap, a conductor lead engaging the cap externally thereof, a clamping device having unlike threaded connection with said cap and said lead respectively for drawing said lead and cap together when the clamping device is rotated, and means to maintain the said fitting and cover cap against relative rotation when the clamping device is rotated.

10. A dielectric bushing, a fitting arranged to be immovably secured to the end of said dielectric bushing, a cover cap seated upon the fitting and having a downwardly extending protecting skirt outside of said fitting, internal threads within the cap, a conductor within the dielectric bushing and having threaded engagement with the threads within the cap, a conductor lead exterior of the cap and arranged to engage with the cap, threads on the exterior of said lead, threads on the exterior of the cap and differing from those on the lead, and a clamping device having unlike threads to co-operate with the threads on the lead and cap to draw said lead and cap together when the clamping device is rotated relative to the lead and cap.

11. In combination, a bushing insulator fitting, a conductor extending through said fitting, an imperforate weather cap having an opening threaded on said conductor and having resilient means for urging threaded portions thereof into different relations with said conductor, thus bringing spring pressure upon the threaded surfaces between said cap and conductor, permitting said cap to be screwed tightly into position to seal the opening in said cap, a conductor lead mounted on the cap exterior thereof, a clamping member having different threaded connections with the exterior of the cap and lead and acting to draw said cap and lead conductor into contact with one another when the clamping member is rotated in one direction without rotation of either of said cap or lead conductor.

12. A dielectric bushing, a metallic fitting thereon having an opening through said fitting, a conductor extending through said bushing, contacting shoulders on said conductor and fitting to limit the outward movement of said conductor, a closure cap threaded on said conductor for drawing said contacting shoulders against each other to hold said conductor in position in said fitting, said cap engaging said fitting to close the opening through said fitting, resilient means in said cap for exerting pressure on the threaded surfaces of said cap and conductor, a lead conductor engaging said cap, a clamping member having differently acting threaded connections with said cap and lead conductor and acting to draw said cap and lead conductor into contact with each other when said clamping member is rotated in one direction, and means to lock said closure cap and lead conductor against relative rotation while said clamping member draws said lead and cap into contact.

13. In a dielectric bushing having a conductor extending therethrough, a terminal member threaded on said conductor, resilient means for causing pressure between the threaded surfaces of said terminal member and conductor, a conductor lead engaging said terminal member, a clamping device having threaded engagement with said terminal member and said lead acting to draw said terminal member and said lead into close engagement with each other when rotated, and means to lock said terminal member and said lead against relative rotation while said clamping device draws said terminal member and lead into contact.

In testimony whereof I have signed my name to this specification on this 29th day of July, A. D. 1922.

ARTHUR O. AUSTIN.